Patented Dec. 23, 1952

2,622,974

UNITED STATES PATENT OFFICE 2,622,974

HERBICIDE

Arthur W. Swezey, Garden Grove, Calif., assignor to The Dow Chemical Company, Midland, Mich., a corporation of Delaware No Drawing. Application May 31, 1950,
Serial No. 165,379

7 Claims. (Cl. 71—2.7)

This invention is concerned with herbicides and is particularly directed to new herbicide compositions comprising halo-acetic acid compounds as toxic ingredients, and a method for controlling undesired vegetation.

A wide variety of herbicide compositions including synthetic organic compounds have been suggested and investigated over the past several years. Many of these materials have been found impractical either because of low effectiveness or the excessive cost of the amounts of active chemical required to accomplish vegetation control. Others have found limited commercial use for the control of particular plant species. Still others are presently in widespread application to control unwanted vegetation under almost any conditions.

Much of the recent enthusiasm for new herbicidal materials and practices has stemmed from operators primarily concerned with the selective control of noxious plant species, particularly in agriculture. Here, the new compositions and their use frequently have displaced manual weeding operations and resulted in tremendous savings in time and money for the grower and large-scale agriculturist. These selective treatments, though costly, are profitable where valuable crop plants are concerned. However, the general control of undesirable vegetation as on ditchbanks, in hedgerows, and along railroad right-of-way and highways is harder to justify from a cost viewpoint. Here, the expense of treatment is not offset by an increased or cleaner crop. The benefits derived from such removal are very real but not always immediately calculable in dollars and cents by the individual or agency concerned.

It is an object of the present invention to provide a new and improved herbicide composition and method. An additional object is to supply a composition which will be adapted to kill all annual vegetation, both broad-leaved and narrow-leaved, in a single application and at a minimum expense. A still further object is to provide a composition and method for inhibiting and retarding the growth of perennial grasses. Other objects will become apparent from the following specification and claims.

According to the present invention, it has been discovered that a mixture of monochloroacetic acid and trichloroacetic acid, or their salts, constitutes a superior herbicidal toxicant composition with which improved results may be obtained in the control of both broad-leaved and narrow-leaved annual vegetation and in the inhibition and retardation of perennial grasses. In such mixture, the toxic constituents appear to be mutually activating so as to accomplish a herbicidal result which is greater than additive.

The indicated mixture appears to operate both as a contact and systemic herbicide poison, being effective against the leaves and stems of the aerial portion of plants and also their roots. The mixture is readily formulated in the form of its solid water-soluble salts, which contributes to convenience of handling, transportation and storage. Residues of the mixture in and on the soil are not permanent and do not poison the soil for long periods of time. Also, residues of the salts are not particularly irritating to humans or objectionable to livestock and other animals. The control of both broad- and narrow-leaf vegetation is readily accomplished without the use of oil with attendant problems of objectionable residue and fire hazard.

When operating in accordance with the present invention, the mixture of acids, or preferably of their water-soluble salts, may be employed in combination with liquid or solid carriers and applied to vegetation in the form of either sprays or dusts. Alternatively, the mixture of acids, salts, or aqueous solutions or solid dispersions of either, may be applied to or worked into the soil to serve as a pre-emergence control measure or as a temporary soil sterilant.

When employed in the form of an aqueous solution, the concentration of the mixed toxicants in the spray mixture is not critical. The amounts of solution applied should be sufficient to provide a dosage of at least 5 pounds each of the monochloroacetic acid and of the trichloroacetic acid per acre. An excess of either constituent is not undesirable and may contribute to the desired result. These dosages are particularly controlling when the solution of toxicant mixture is being applied for the control of emerged plant seedlings. For pre-emergence application, satisfactory results are obtained with as little as 5 pounds of monochloroacetic acid and 2 pounds of trichloroacetic acid per acre, depending upon the plant species concerned.

The exact proportions of monochloroacetic acid and trichloroacetic acid, or their salts, employed in a given mixture may vary, provided the acre dosages outlined above are observed. However, from 1 to 5 parts by weight of the monochloro-compound is usually employed with each 2 parts of the trichloroacetic acid.

When employing the toxicant mixture as a constituent of dust compositions, good results may be obtained with from 5 to 50 per cent by weight of the chloroacetic acids or their salts in intimate dispersion with a finely divided solid carrier. The preferred dosages per acre are substantially those as set forth above for spray compositions, although best results are obtained with from 5 to 10 pounds of each of the acid materials per acre.

In the foregoing paragraphs it is to be understood that the amounts set forth in pounds of toxicant per acre are minimum dosages, and that in practice increased amounts up to 10 to 30 pounds per acre of each toxic ingredient are sometimes advantageous. The exact dosage selected is largely dependent upon the existing climatic conditions, the species of vegetation to be controlled, the form in which the toxicant is employed, and the time of application in the life cycle of plants. Thus, relatively small amounts of material are effective under moisture conditions conducive to vigorous growth, while larger amounts are required under conditions of drouth. Some species of plants are more susceptible than others. When employed in the form of sprays, somewhat smaller amounts of toxicant are required than with dust compositions. Also, newly emerged seedlings in vigorous state of growth are more susceptible to small dosages of the toxicant mixture than are mature stands of vegetation which have passed into semidormancy and hardened off. In any event, both the dosages and proportions of materials employed are those which accomplish a mutual activation and a greater than additive result with respect to the control of the undesired plant life.

The designation "water-soluble salts," as appearing in the foregoing paragraphs, refers to both the metal and amine salt derivatives of the monochloroacetic and trichloroacetic acids and is inclusive of the sodium, potassium, ammonium, magnesium, cadmium, zinc, calcium, copper, triethanolamine, diethanolamine, monoethanolamine, isopropylamine, triethylamine, and ethylenediamine salts of the acids in question.

Solid carriers which may be employed in dust formulations include diatomaceous earth, pyrophyllite, clays, talc, wood flours, finely divided peat, fertilizers and the like. Any of the conventional spray adjuvants may be employed in the aqueous solutions of toxicants, provided only that the former do not reduce the effectiveness of the toxicant mixture as by reacting with the acid compounds to form nontoxic derivatives or otherwise. Representative materials of established operability include sodium lauryl sulfate, aryl sulfonic acids and their salts, and polyglycol ether ester derivatives.

The toxicant mixtures of the present invention have a high potential in the control of mixed stands of broad-leaf and narrow-leaf vegetation in situations where other known herbicide materials are not always satisfactory. Thus, in ditchbank vegetation control in irrigation systems, the use of hormone-type herbicides represents a measure of hazard because of the possibility of subsequent contamination of crop plants. Similarly, in the control of vegetation along roadsides, in barnyards, along hedgerows, and in industrial areas, the use of conventional petroleum oil and fortified oil compositions is objectionable from the point of view of undesirable residues both on plant growth and on soil, as well as the danger of fire hazard. The composition and method of the present invention avoid these disadvantages.

In a representative operation, a mixture of the sodium salts of monochloroacetic acid and of trichloroacetic acid was dissolved in water and this composition employed as a spray to control a roadside stand of mixed broad-leaf and narrow-leaf vegetation. At the same time, the salts of the two acids were separately employed in exactly analogous comparative applications. The broad-leaf weeds in the stand were bur clover in 3 to 6 inch rosette stage of growth, wild lupine 6 to 8 inches tall, red-stem filaree in 3 to 4 inch rosette, wild mustard in 4 to 10 inch rosette, and fiddleneck in pre-bud stage. The narrow-leaf plants were principally annual grasses including rip-gut grass, wild oat and foxtail barley. The plants were growing on moist, medium sandy loam, and the weather at time of treatment and during the 17-day observation period was clear and warm.

The spray was applied with a pressure hand sprayer at 40–50 pounds per square inch and at 100 gallons per acre. Application was made between 10 o'clock a. m. and 1 o'clock p. m. The pH of the aqueous solution was between 6 and 7, and a commercial wetting agent marketed as Triton X–100 (alkylated aryl polyether alcohol) was employed in the spray composition in the proportion of 2.5 ounces per 100 gallons.

Prior to application, counts were made of the red-stem filaree plants in the area under treatment. Seventeen days following treatment, the filaree plants were again counted and all vegetation was carefully examined to determine the degree of control. Against filaree, sodium monochloroacetate at 10, 20 and 40 pounds acid equivalent per acre gave kills of 0, 20 and 50 percent respectively. Similarly, sodium trichloroacetate at 10, 20 and 40 pounds acid equivalent per acre gave kills of 0, 0 and 0 percent, respectively. A 50–50 mixture of the two salts at 20 and 40 pounds acid equivalent per acre gave kills of 80 and 90 percent, respectively. Against all vegetation in the treated areas, the monochloroacetic acid at 20 and 40 pounds per acre gave controls of 23 and 68 percent, respectively; the trichloroacetic acid at 20 and 40 pounds per acre gave controls of 7 and 9 percent, respectively; and the 50–50 mixture of materials gave a control of 73 percent at a dosage of 40 pounds per acre. With respect to the latter observation, the broad-leafs were for the most part dead, and the few surviving grasses stunted and yellowing.

Other compositions adapted to be similarly employed include the following:

*Composition A*

| | Parts by weight |
|---|---|
| Sodium monochloracetate | 100 |
| Trichloroacetic acid | 30 |
| Sodium lauryl sulfate | 5 |

This composition, on dispersion in water, is applied for control of vegetation on ditchbanks in the dosage of 50 pounds per acre treated.

*Composition B*

| | Parts by weight |
|---|---|
| Ammonium monochloracetate | 50 |
| Ammonium trichloroacetate | 100 |

In aqueous solution, this composition is applied for control of mixed vegetation along railroad right of way in the dosage of 40 pounds per acre treated.

*Composition C*

| | Parts by weight |
|---|---|
| Monochloroacetic acid | 100 |
| Trichloroacetic acid | 100 |
| Diatomaceous earth | 800 |

This composition is worked lightly into the surface of cultivated and fitted land, immediately following planting with beans, as a pre-emergence herbicide to control the growth of seedling broad-leaf weeds and grasses. The dosage is 50 pounds to the acre.

*Composition D*

| | Parts by weight |
|---|---|
| Triethanolamine salt of monochloroacetic acid | 100 |
| Triethanolamine salt of trichloroacetic acid | 50 |

This composition is dissolved in water in the amount of 20 pounds per 100 gallons and applied as a post-emergence spray to the mixed broad- and narrow-leaf seedlings present between the rows of canes in a raspberry planting to obviate the necessity for controlling weeds by cultivation. The applied dosage is 20 pounds per acre.

The use of monochloroacetic acid and its salts as constituents of herbicidal compositions is described in a copending application Serial No. 104,587, filed on July 13, 1949.

I claim:

1. A herbicide composition comprising an aqueous solution of water-soluble salts of monochloroacetic acid and of trichloroacetic acid, said salts being present in the proportion of from 1 to 5 parts by weight acid equivalent of monochloroacetic acid and 2 parts by weight acid equivalent of trichloroacetic acid, respectively.

2. A herbicide composition comprising as active toxicants a mixture of from 1 to 5 parts by weight of monochloroacetic acid and 2 parts by weight of trichloroacetic acid, said toxic materials being present in the composition as members of the class of the free acids and their water-soluble salts.

3. A herbicide composition comprising an aqueous solution of the sodium salts of monochloroacetic acid and of trichloroacetic acid, said salts being present in the proportion of from 1 to 5 parts by weight acid equivalent of monochloroacetic acid and 2 parts by weight acid equivalent of trichloroacetic acid, respectively.

4. A herbicide composition comprising as active toxicants a mixture of alkali metal salts of monochloroacetic acid and of trichloroacetic acid, said salts being present in the proportion of from 1 to 5 parts by weight acid equivalent of monochloroacetic acid and 2 parts by weight acid equivalent of trichloroacetic acid, respectively.

5. A herbicide composition comprising as active toxicants a mixture of water-soluble salts of monochloroacetic acid and of trichloroacetic acid, said salts being present in the proportion of from 1 to 5 parts by weight acid equivalent of monochloroacetic acid and 2 parts by weight acid equivalent of trichloroacetic acid, respectively.

6. A method for the control of noxious plant growth which includes the steps of contacting said plant growth with a composition comprising a mixture of monochloroacetic acid and trichloroacetic acid, said toxic materials being present in the composition as members of the class of free acids and their water-soluble salts, and the amounts and proportions of toxicant applied being such as to provide a dosage equivalent to at least 5 pounds each of free monochloroacetic acid and of free trichloroacetic acid per acre treated.

7. A method for the control of noxious plant growth by preemergent application, which includes the steps of applying to and working into the soil a composition comprising a mixture of monochloroacetic acid and trichloroacetic acid, said toxic materials being present in the composition as members of the class of free acids and their water-soluble salts, and the amounts and proportions of toxicants applied being such as to provide dosages equivalent to at least 5 pounds of free monochloroacetic acid and 2 pounds of free trichloroacetic acid per acre treated.

ARTHUR W. SWEZEY.

REFERENCES CITED

The following references are of record in the file of this patent:

UNITED STATES PATENTS

| Number | Name | Date |
|---|---|---|
| 1,757,100 | Strosacker | May 6, 1930 |
| 2,393,086 | Bousquet | Jan. 15, 1946 |